Dec. 1, 1931.  W. E. THAU  1,834,188
CONTROL SYSTEM
Filed March 15, 1928
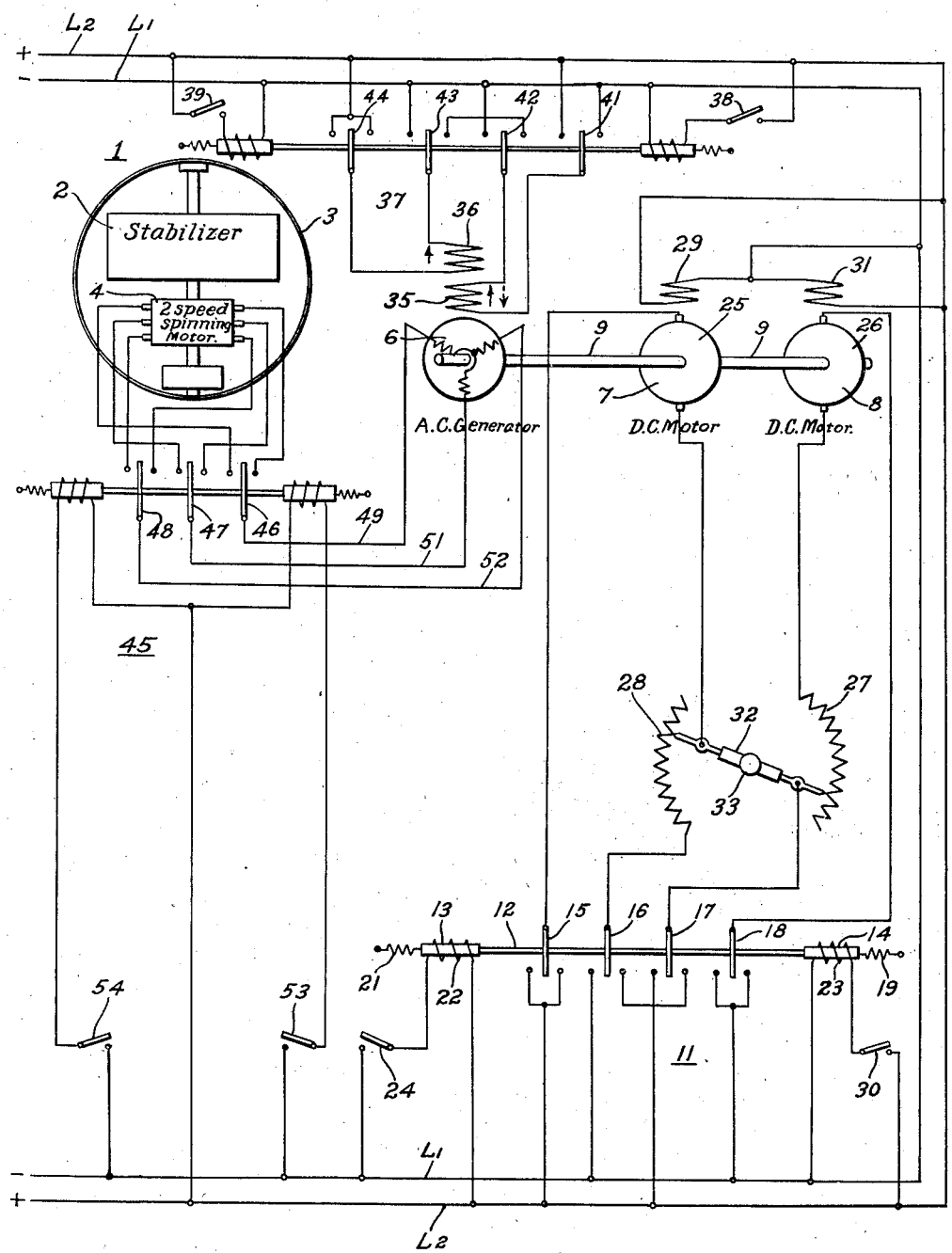
INVENTOR
Walter E. Thau.
BY
ATTORNEY Patented Dec. 1, 1931

1,834,188

UNITED STATES PATENT OFFICE

WALTER E. THAU, OF SOUTH ORANGE, NEW JERSEY, ASSIGNOR TO WESTINGHOUSE ELECTRIC & MANUFACTURING COMPANY, A CORPORATION OF PENNSYLVANIA

CONTROL SYSTEM

Application filed March 15, 1928. Serial No. 261,854.

This invention relates to control systems and more particularly to the control of electric motors.

The object of the invention, generally stated is to provide for the control of electric motors employed in operating gyroscopic stabilizers or other devices having similar characteristics.

A more particular object of the invention is to provide for effectively starting and efficiently operating a gyroscopic stabilizer system of this character.

In order to overcome the large moment of inertia in a gyroscopic stabilizer, it is necessary to provide a prime mover having a comparatively large starting torque.

The customary practice, in systems of this character, in the past, has been to employ a single large motor which is capable of developing sufficient starting torque to overcome the starting inertia. It has been found, however, that such motors are larger than are necessary to carry the running load, and consequently reduce the economic efficiency of the system. In a system organized in accordance with this invention, a plurality of relatively small motors are disposed in such a way that they provide the necessary starting torque required to start the stabilizer, and also operate the stabilizer under normal running condition, efficiently and economically.

A more complete understanding of the invention may be had by referring to the accompanying drawing wherein the single figure is a diagrammatic view of an embodiment of the invention.

In the drawing, a gyroscopic stabilizer 1 is illustrated, comprising a spinning wheel 2, suitably supported in a frame 3, and a two-speed induction motor 4 which is operably coupled to rotate the spinning wheel. A source of alternating current, in the form of an alternating-current generator 6, is provided for operating this motor, and is driven by the direct-current motors 7 and 8. The armatures 25 and 26 of the motors 7 and 8, respectively, and the armature winding of the generator 6 are shown mechanically coupled to a shaft 9.

The motors 7 and 8 may be electrically connected to a constant voltage source of electric energy, such as the line conductors L1 and L2.

A large moment of inertia and static friction must be overcome, in starting the spinning wheel 2 of the stabilizer, and it is, therefore, necessary to develop a large starting torque in the driving motors without injuring the armature windings of the motors. This is accomplished by connecting the armature windings 25 and 26 of the motors 7 and 8, respectively, in series circuit relation while starting. An electromagnetic multiple-pole switch 11 is employed for properly connecting the armature windings 25 and 26 to the source of energy. The switch, as illustrated, comprises an actuating shaft 12 which is provided at opposite ends with electromagnets having armatures 13 and 14, respectively, and with a plurality of pivotally mounted switch contact members 15, 16, 17 and 18. A pair of spring members 19 and 21 are employed to normally bias the bridging members 15, 16, 17 and 18 toward their neutral positions. Operably associated with the armatures 13 and 14 are two coils 22 and 23 which may be connected through pushbutton switches 24 and 30, respectively, to the line conductors L1 and L2.

Accordingly, with the closing of one of the pushbutton switches 24 or 30, the switch 11 may be actuated to connect the armature windings 25 and 26 of the motors 7 and 8, respectively, either in parallel circuit relation to or in series circuit relation with the line conductors L1 and L2, depending upon the direction in which the multiple-pole switch 11 is actuated.

When the pushbutton switch 30 is closed the main switch 11 is operated by the coil and armature 14 to connect the armature windings 25 and 26 of the motors 7 and 8 in series circuit relation across the line conductors L1 and L2. The circuit extends from line conductor L1 through the bridging member 18 of the switch 11, the armature winding 26 of motor 8, the resistor 27, bridging member 17, bridging member 16, resistor 28, the armature winding 25 of the motor 7 and the bridging member 15 to the line conductor L2. When the pushbutton switch 30 is open, and the pushbutton switch 24 is closed, the multiple-pole switch will be actuated in the other direction by the coil 22 and armature 13 to connect the armatures of the two motors 7 and 8 in parallel circuit relation across the line conductors L1 and L2. The circuit for the armature winding 26 extends from line conductor L1 through the bridging member 18 of the switch 11, the armature 26, resistor 27, the bridging member 17, to line conductor L2 and the circuit for the armature winding 25 extends from line conductor L1 through the bridging member 16 of switch 11, resistor 28, the armature winding 25, and the bridging member 15 to line conductor L2.

In this particular application, the field windings 29 and 31 of the motors 7 and 8, respectively, are connected in parallel circuit relation across the line conductors L1 and L2. In order to properly control the speed of the motors 7 and 8, the resistors 27 and 28 referred to hereinbefore are provided. The ohmic resistance of the resistors may be of such a value that the speed of the motors is reduced to 50% of their full speed value when the resistors are completely inserted in circuit with the armature windings 25 and 26. To facilitate their simultaneous adjustment, the single bridging arm 32 is provided.

When the motors 7 and 8 are connected in series circuit relation and the resistors 27 and 28 are eliminated from the circuit, the speed of the motors will be substantially the same as when the motors are connected in parallel circuit relation with the resistors entirely inserted in the armature circuits. It will be readily seen that, when the motors are connected in parallel circuit relation without the resistors in circuit, the speed of the motors will be substantially four times as great as when they are connected in series circuit relation with the resistors all inserted in the circuit.

In order to run the motors at effective speeds, while the system is starting, and to cause the generator 6 to produce low frequency current, two sets of generator field windings 35 and 36 are provided. The field windings may be connected to the line conductors L1 and L2 in parallel circuit relation, when it is desired to cause the generator 6 to supply a low frequency current to the spinning motor, or in series circuit relation, when it is desired to supply high frequency current. A multiple-pole switch 37, which incidentally may take the same form as the switch 11, may be utilized for making the proper field winding connections, and it may be operated by a pair of pushbutton switches 38 and 39 in the same way as switch 11.

With the pushbutton switch 39 closed and the pushbutton switch 38 open, the switch will be actuated to connect the field windings 35 and 36 in parallel circuit relation to line conductors L1 and L2. The circuit for field winding 35 extends from line conductor L2 through the bridging member 41 of the switch 37 in the direction of the full-line arrow, and field winding 35, the bridging member 42 to line conductor L1. The circuit for the field winding 36 extends from line conductor L2 through bridging member 44 of the switch 37, field winding 36 and bridging member 43 in the direction of the full-line arrow to line conductor L1.

With the pushbutton switch 39 open and the pushbutton switch 38 closed, the multiple-pole switch 37 will be actuated to connect the field windings 35 and 36 in series circuit relation across the line conductors L1 and L2 through a circuit extending from line conductor L2 through the bridging member 44 of the switch 37, the field winding 36 in the direction of the full-line arrow, the bridging member 43, the bridging member 42, the field winding 35 in the direction of the dotted line arrow and the bridging member 41 to line conductor L1. The number of generator field poles produced by connecting the windings 35 and 36 in series circuit relation is twice that produced by connecting them in parallel circuit relation. Accordingly, for any desired frequency the generator 6, with the series field connections, must be driven at half the speed required to generate currents of the same frequency when the field windings are connected in parallel circuit relation, i. e., upon changing the field winding connections from parallel to series relationship, the generated frequency for the same speed will be doubled.

The spinning motor 4, employed for driving the stabilizer, may be an induction motor. To further permit higher starting speeds in the generator driving motors, the spinning motor 4 may be provided with two sets of primary windings, making it possible to operate the motor at two different speeds with current of a given frequency, depending upon whether the windings are connected in series circuit relation, or in parallel circuit relation, thereby determining the number of electric poles on the machine. The motor windings have not been shown in the drawing, as this type of motor is so well known in the art that it is deemed unnecessary.

A multiple-pole switch 45, similar to the switches 11 and 37, described hereinbefore, may be provided for effecting the different speed connections for the spinning motor 4. The bridging members 46, 47 and 48 are connected to line conductors 49, 51 and 52, respectively, which conduct the current from the alternating-current generator 6 to the spinning motor 4.

Assume that when the switch 45 has been actuated by the pushbutton switch 53, the spinning motor is connected with its field windings in series circuit relation for high speed operation and when it is actuated by pushbutton switch 54, it connects the field windings in parallel circuit relation for low speed operation.

When the stabilizer is at rest and it is desired to bring it up to full speed, to effect the highest possible safe starting torque, the motors 7 and 8 may be connected in series circuit relation across the line conductors L1 and L2 in the circuit described hereinbefore. The resistors 27 and 28 will be entirely inserted in the motor circuit, thereby reducing the speed of these motors to their lowest value. The generator field windings 35 and 36 will now be connected in parallel circuit relation, as described hereinbefore, so that the generator will generate its lowest frequency, and the spinning motor will be connected to the generator with its field windings connected in parallel circuit relation for low speed operation. When the above connections are established, the stabilizer will start.

As the stabilizer increases in speed, the rheostat arm 32 may be moved to gradually remove the resistors 27 and 28 from the circuit and bring the motors up to their maximum series circuit speed. When this speed has been reached, the switch 37 may be actuated to connect the field windings of the alternating-current generator in series circuit relation in the manner described hereinbefore, so that the generator will produce a voltage having twice the frequency previously generated when driven at the same speed of rotation.

At the same time the switch 37 is actuated to connect the field winding of the generator in series circuit relation, the rheostat arm 32 may be moved to re-insert the entire ohmic value of the resistors 27 and 28 in circuit, to reduce the speed of these motors by approximately one-half. The result of doubling the number of generator poles, and of reducing the speed of the driving motors, is that the frequency of the generator 6 is substantially the same as it was before the change.

The resistors 27 and 28 may be again gradually cut out of the circuit, bringing the motors once more up to their highest operating speed with the series connection. The effect of this operation is to gradually increase the frequency applied to the spinning motor and accordingly increase the speed of the stabilizer.

When the full speed has been reached in this operation, the switch 11 may be actuated by opening the pushbutton switch 30 and closing the pushbutton switch 24 to connect the motors 7 and 8 in parallel circuit relation across the line conductors L1 and L2 in the manner described hereinbefore. With this actuation of the switch 11, the resistors 27 and 28 should be entirely reinserted in the armature circuits to maintain the motors at substantially the same speed. Then the resistors 27 and 28 may be once more gradually cut out of the circuits and the motors brought up to their full speed for parallel operation, which is their highest and normal operating speed. The speed of the motors 7 and 8 will be transmitted to the spinning motor 4 in accordance with the increased frequency supplied by the generator 6, and will increase the speed of the gyroscopic stabilizer.

After the stabilizer has been brought up to a uniform speed, while the motor 4 is connected for low speed operation, the switch 45 may be actuated by opening pushbutton switch 53 and closing pushbutton switch 54, thus connecting the spinning motor 4 for high speed operation. At the time this high speed connection is established, the resistors 27 and 28 should again be inserted in the armature circuits to reduce the speed of the motors to approximately half their previous value, and the speed of the spinning motor will accordingly remain substantially the same.

The resistors 27 and 28 may be once more gradually cut out, and the stabilizer accelerated to its highest operating speed with the described circuit connections. Variations may be made in the speed of the spinning motor, however, by adjusting the resistors 27 and 28 in the armature circuits of the two motors.

It will be readily understood that the sequence with which the steps described are performed may be varied in a number of ways to bring the system up to normal operating speeds with substantially the same results. In the system, a plurality of speed steps are provided for effective starting and efficiently bringing the system up to operating speed.

While the invention has been described in a preferred embodiment, it is intended that all matter contained herein shall be interpreted as illustrative and not in a limiting sense, since manifestly the same may be considerably varied without departing from the spirit of the invention as set forth in the appended claims.

I claim as my invention:

1. In a control system, in combination, an induction motor for actuating a gyroscopic stabilizer, said motor being provided with a plurality of primary windings, a generator for supplying the induction motor with alternating current, said generator comprising armature and field coil windings arranged to present a predetermined number of poles or a multiple thereof, a plurality of motors for actuating the generator, a source of substantially constant voltage for energizing said motors, and a variable resistor associated with each motor for regulating its speed, means for connecting the primary windings of the induction motor in parallel, or in series circuit relation, means for connecting the field coil windings of the generator in parallel or series circuit relation, and means for connecting the generator actuating motors through the resistors in parallel or series circuit relation to the source of substantially constant voltage.

2. In a control system, in combination, an induction motor for actuating a gyroscopic stabilizer requiring a relatively large energy input for starting, a generator for supplying the induction motor with alternating current, means for changing the frequency of the current produced by the generator independently of the speed at which the generator is operated, a plurality of motors for actuating the generator, a source of energy for energizing the motors, means for connecting the motors in series for starting in order to effect a low fequency generated by the generator and a relatively large starting torque in the motors, and means for connecting the motors in parallel as the stabilizer is brought up to speed.

3. In a control system, in combination, an alternating current motor for actuating a gyroscopic stabilizer, a dynamo-electric machine for providing said motor with current, a plurality of motors for actuating the dynamo-electric machine, and a source of energy for said motors, means for varying the speed of the alternating current motor, without changing the frequency of the current supplied by the dynamo-electric machine, means for changing the frequency of the current produced by the dynamo-electric machine without changing the speed at which it is operated, and means for connecting the motors actuating the dynamo-electric machine in series circuit relation when the stabilizer is being started and in parallel circuit relation to each other as the stabilizer is brought up to operating speed.

4. In a control system, in combination, a relatively heavy starting load, an induction motor having a plurality of primary windings for actuating said load, a generator for supplying alternating current to the induction motor, said generator being provided with a plurality of field coil windings, a plurality of motors for actuating the generator, a source of energy for actuating said motors, means for connecting the primary windings of the induction motor either in parallel or series circuit relation to vary the effective number of poles of the induction motor and thus effect different motor speeds, means for connecting the field coil windings of the generator either in series or in parallel circuit relation to vary the effective number of poles of the generator whereby currents of a predetermined frequency or a multiple thereof are supplied to the induction motor and thus effect different motor speeds, and means for connecting the generator driving motors either in series or in parallel circuit relation with the source of energy provided for operating them to further regulate the speed of the induction motor.

In testimony whereof, I have hereunto subscribed my name this 5th day of March, 1928.

WALTER E. THAU.